United States Patent [19]
Bainard

[11] 3,873,104
[45] Mar. 25, 1975

[54] SEAL
[75] Inventor: Dean R. Bainard, Gilford Village, N.H.
[73] Assignee: International Packings Corporation, Bristol, N.H.
[22] Filed: Mar. 8, 1972
[21] Appl. No.: 232,781

[52] U.S. Cl. ............................................. 277/134
[51] Int. Cl. ........................................... F16j 15/54
[58] Field of Search .................................... 277/134

[56] References Cited
UNITED STATES PATENTS
3,586,342  6/1971  Staab ................................. 277/134
3,672,690  6/1972  Berens ............................... 277/134
3,790,180  2/1974  Heyn et al. ......................... 277/134

FOREIGN PATENTS OR APPLICATIONS
1,954,972  5/1970  Germany ............................ 277/134

Primary Examiner—Samuel B. Rothberg

[57] ABSTRACT

In combination with a smoothly curved surface to be sealed having a circular section, a bidirectional seal comprising a molded sealing element of resilient material having a surface terminating in a constant radius circular sealing edge, and a plurality of smoothly curved rib segments formed on said surface, having ends circumferentially spaced from one another, each said rib member being tangent to said sealing edge at a point between its said ends.

1 Claim, 10 Drawing Figures

＃ SEAL

This invention relates to fluid seals. In particular, it relates to seals used for retaining a liquid such as oil in a housing surrounding a shaft, when either the housing or the shaft is rotating, the seal providing both static and dynamic sealing action independently of the direction of the rotation.

It is known that a seal providing dynamic sealing action for a single direction of rotation may be provided with helical threads on the surface on the air side of the sealing edge, the threads tending to feed back the liquid and thus improve the dynamic seal. However, it has been a problem to provide such a seal that has improved dynamic sealing capability for rotation in either direction.

Accordingly, it is an object of the present invention to provide a fluid seal that has both static and improved dynamic sealing capability for rotation in either direction.

The bidirectional seal of the invention comprises a molding sealing element of resilient material, having a surface terminating in a constant radius circular sealing edge. A plurality of smoothly curved rib segments are formed on the surface with their ends circumferentially spaced from one another, and each rib segment is tangential to the sealing edge at a point between its ends. In combination with a shaft, the bidirectional seal of the invention has a flared surface terminating in a constant radius circular sealing edge, and, preferably, each rib member has a defining line lying in a plane intersecting the surface.

In a preferred embodiment, the seal is a shaft seal having a molded frusto-conical surface, and the rib segments are molded thereon in the form of conic section segments. Each rib segment has a uniform triangular cross section, providing a surface inclined toward the sealing edge, substantially parallel with the axis of the sealing element; and the edge of the rib adjacent the sealing edge is the defining line and is a segment of a conic section.

Other objects, features and advantages will appear from the following description of a preferred embodiment of the invention, taken together with the attached drawings thereof, in which.

Figure 1:
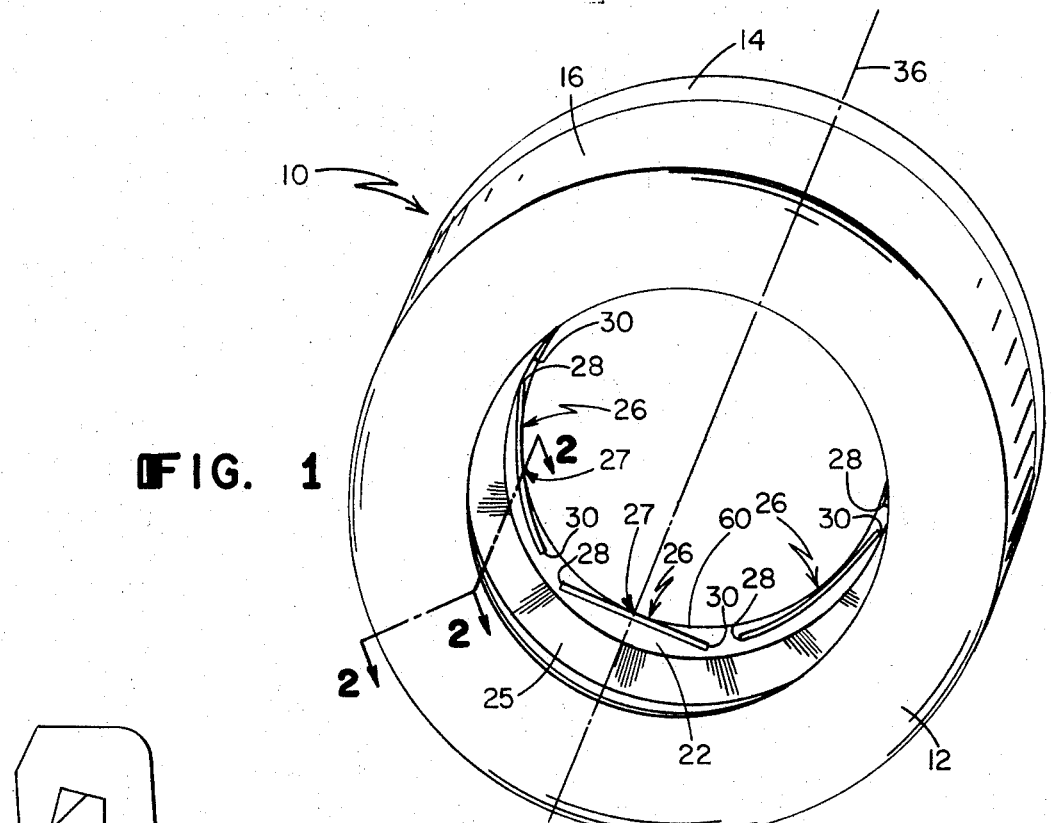
FIG. 1 is a perspective view of a first embodiment of the shaft seal of the invention, viewed in the plane perpendicular to the frusto-conical surface.

Referring now to the drawings, and particularly to FIG. 1, in a first embodiment of the invention, a shaft seal 10 comprises a molded sealing ring 12 of a resilient material, which has an outer cylindrical wall portion 14 reinforced by a rigid ring 16, and a flexible inner portion 18 with garter spring 20. Flexible portion 18 provides a frusto-conical surface 22, bounded above by a circular sealing edge 24 of constant radius of about 0.679 inches in the specific embodiment illustrated and bounded below by a frusto-conical surface 25 of somewhat smaller apex angle than that of surface 22.

According to the invention, a plurality of smoothly curved hydrodynamic rib segments 26 are formed on surface 22 tangent to sealing edge 24 at points 27 between their ends 28, 30; rib segments 26 curve away from the sealing edge so that ends 28, 30 are spaced therefrom. The end 28 of each rib segment 26 is circumferentially spaced from the end 30 of an adjacent segment. Each rib segment is of large radius relative to that of sealing edge 24, so that the ends thereof are at a small distance from sealing edge 24 for highly efficient bidirectional pumping action, with minimum likelihood of pumping contaminants.

Figure 2:
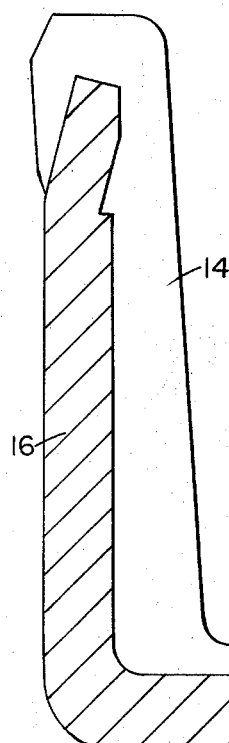
FIG. 2 is a cross-section taken along the line 2—2 of FIG. 1.
Figure 4:
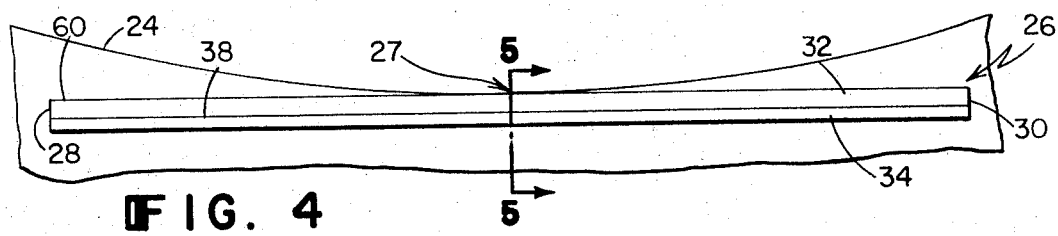
FIG. 4 is a detail view of a rib segment, viewed in the plane perpendicular to the frusto-conical surface.
Figure 3:
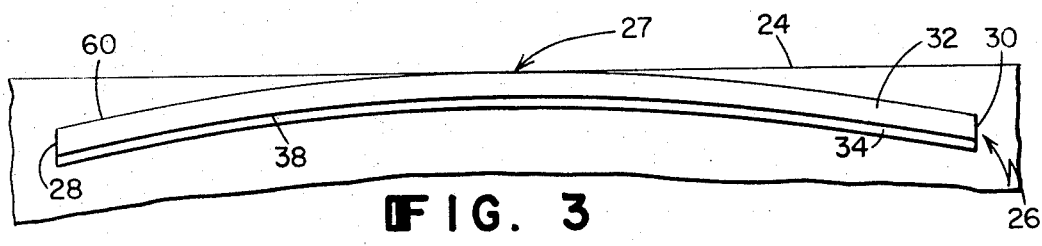
FIG. 3 is a detail view of a rib segment, viewed in the plane of the sealing edge.

In a preferred embodiment, the leading edge 60 of surface 32 of a rib segment 26 lies in a rib segment plane 40 which is perpendicular to conical surface 22, as shown in FIG. 2, and leading edge 60 describes a segment of an ellipse. When rib segment 26 is viewed in plane 42, that is, in the plane of sealing edge 24 (FIG. 3), the elliptical shape of rib segment 26 is seen. When rib segment 26 is viewed in plane 40, however, it appears straight (FIG. 4) while leading edge 24 appears to curve away from it.

The fact that in the plane perpendicular to the conical surface the curved rib segment appears straight offers advantages in the construction of a mold for the manufacture of this shaft seal, and it is therefore desirable for the rib segment to lie in this plane.

Figure 8:
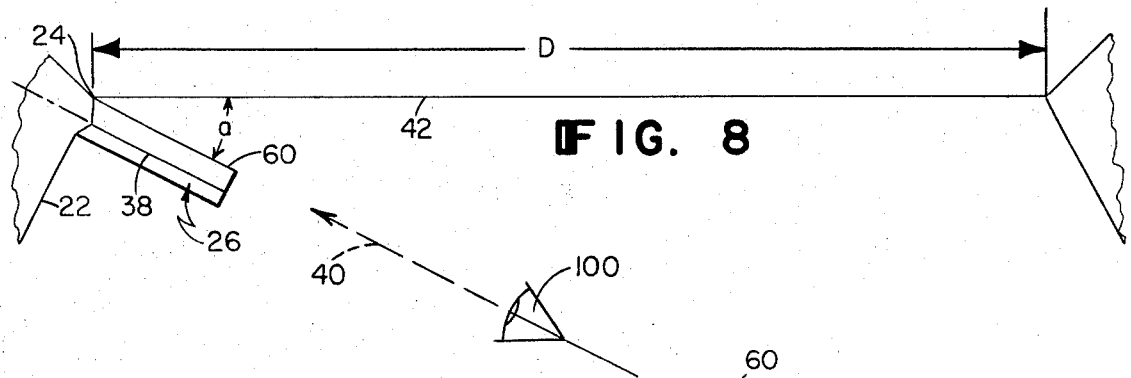
FIg. 8 is a detail view of the seal showing the angle between the rib segment plane and the sealing edge plane.

The distance $d$ from an end 28 or 30 of a rib segment 26 to sealing edge 24 for a rib segment of any chordal length K is given by a formula derived as follows. Referring especially to FIG. 8, edge 60, which is taken as the defining line of the rib segment 26, lies entirely in plane 40, while sealing edge 24 lies in plane 42. The angle $a$ is the angle between rib segment plane 40 and sealing lip plane 42. To an observer 100, sighting along the plane 40, rib segment 26 appears straight, while sealing edge 24 appears to curve away from it to either side, describing an apparent ellipse. This ellipse has a major axis D and a minor axis D sin $a$. Since the point of tangency 27 is on the minor axis of this apparent ellipse, the radius of curvature of the ellipse is given by (1) $R = (D/2)^2/D\sin a/2) = D/(2 \sin a)$ (For the derivation of this expression, see page 2–53; MARKS' STANDARD HANDBOOK FOR MECHANICAL ENGINEERS (Seventh Edition); McGraw-Hill; 1967.)

Figure 9:
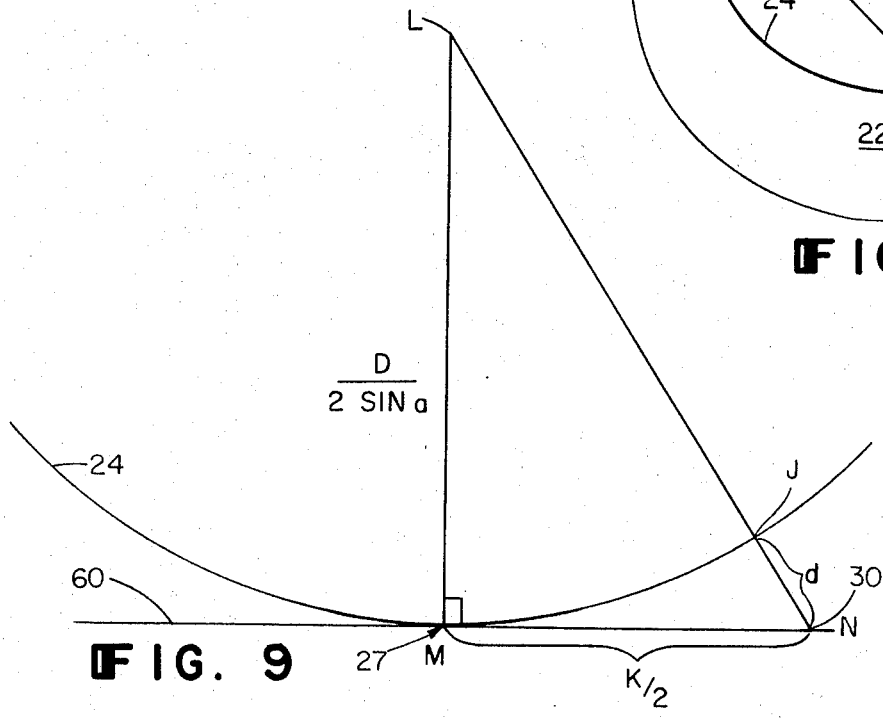
FIG. 9 is a geometric construction in the rib segment plane.

This view (in plane 40) is schematically represented in FIG. 9. A right triangle LMN can now be constructed with a right angle at M (the point of tangency 27), apex L at the origin of the radius of curvature of the ellipse, and apex N at the end 30 of the rib. Side MN is known, being one-half of the chordal length of the rib or K/(2). Side ML is given by equation (1) and equals line segment LJ. Side LN can now be found by the Pythagorean theorem; and line segment JN = LN − LJ or (2) $\quad d = \sqrt{(D/2 \sin a)^2 + (K/2)^2} - D/(2 \sin a)$ In this embodiment, ends 28 and 30 of a rib segment 26 are spaced from sealing edge 24 by distance $d$ of preferably about 0.050 inches to limit pumping of contaminants. Each end 28 of a segment 26 is circumferentially spaced from the end 30 of an adjacent segment 26.

Figure 6:
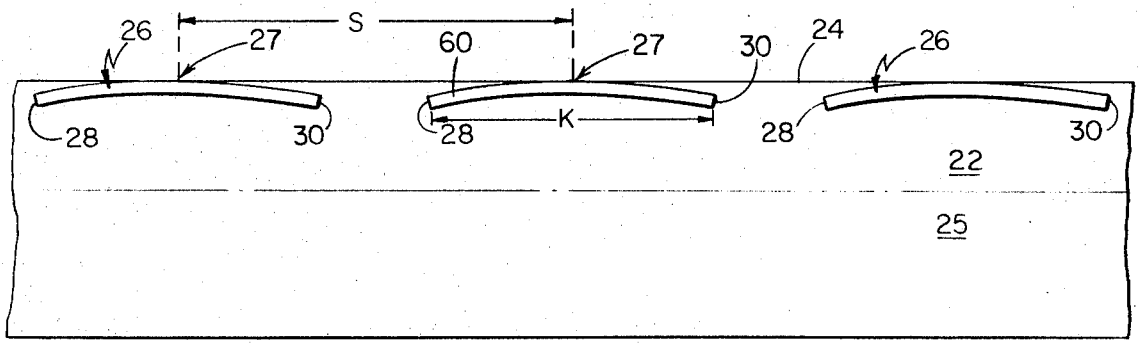
FIG. 6 is a projection of half of the inner surface of the shaft seal showing three rib segments.
Figure 10:
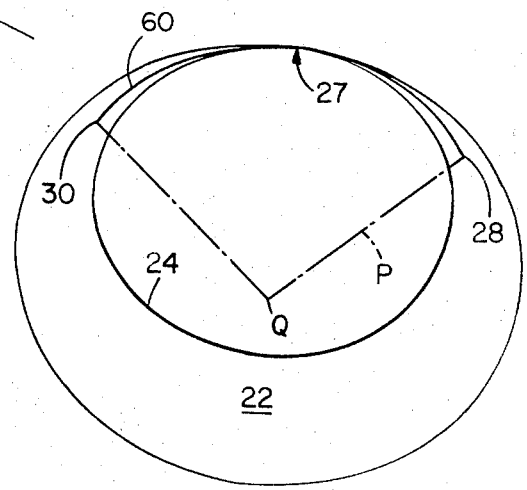
FIG. 10 is a geometric construction perpendicular to the rib segment plane.

For each rib segment 26, view perpendicular to its plane 40 as in FIG. 10, the average radius of curvature P in the preferred embodiment is about 1.6 inches, or more than twice the radius (about 0.7 inch) of sealing edge 24 in its plane 42. In all embodiments, the average radius of curvature P in the rib segment plane is greater than the radius $D/2$ of sealing lip 24 in its plane. In the preferred embodiment, segment 26 subtends an angle at center Q of about 20°. Tangent points 27 and 27 of adjacent rib segments 26 (FIG. 6) are separated by a distance S of less than twice the average radius of curvature P, with adjacent ends 28, 30 being circumferentially spaced from one another, so that a large number of rib segments may be provided around the seal, there being six in the specific embodiment herein illustrated.

Figure 5:
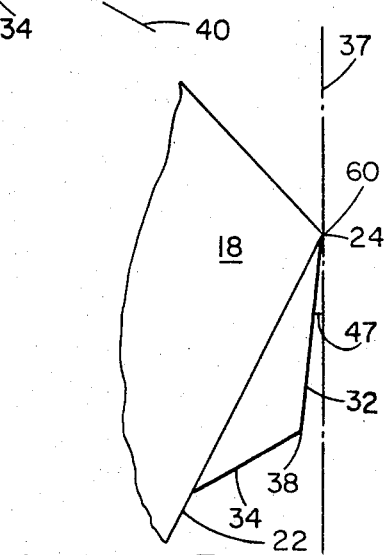
FIG. 5 is a detail cross-section taken on the line 5—5 of FIG. 4.

In the preferred embodiment, each rib segment 26 has a triangular cross section, the base lying in the surface 22, and the remaining two sides being of unequal length; long side 32 inclining toward sealing edge 24 and bounded by leading edge 60 has a slope less than that of short side 34 inclining away from sealing edge 24. At the point of tangency 27, long side 32 meets sealing edge 24 without intersecting it, as shown in FIG. 5, curving away from the sealing edge at all other points of the rib.

When seal 10 is not on a shaft, flexible portion 18 is inclined inwardly toward the seal axis, indicated by line 41 parallel to said axis (FIG. 2). Inner side 19 of portion 18 forms a small angle 43 with line 41, preferably of about 5°. At the same time, long side 32 of rib 26 slopes inwardly with respect to seal axis 36 from apex 38 to sealing edge 24 (FIG. 5). Line 37 is parallel to seal axis 36; at sealing edge 24, side 32 forms with line 37 a small angle 47, preferably of about 5°.

Figure 7:
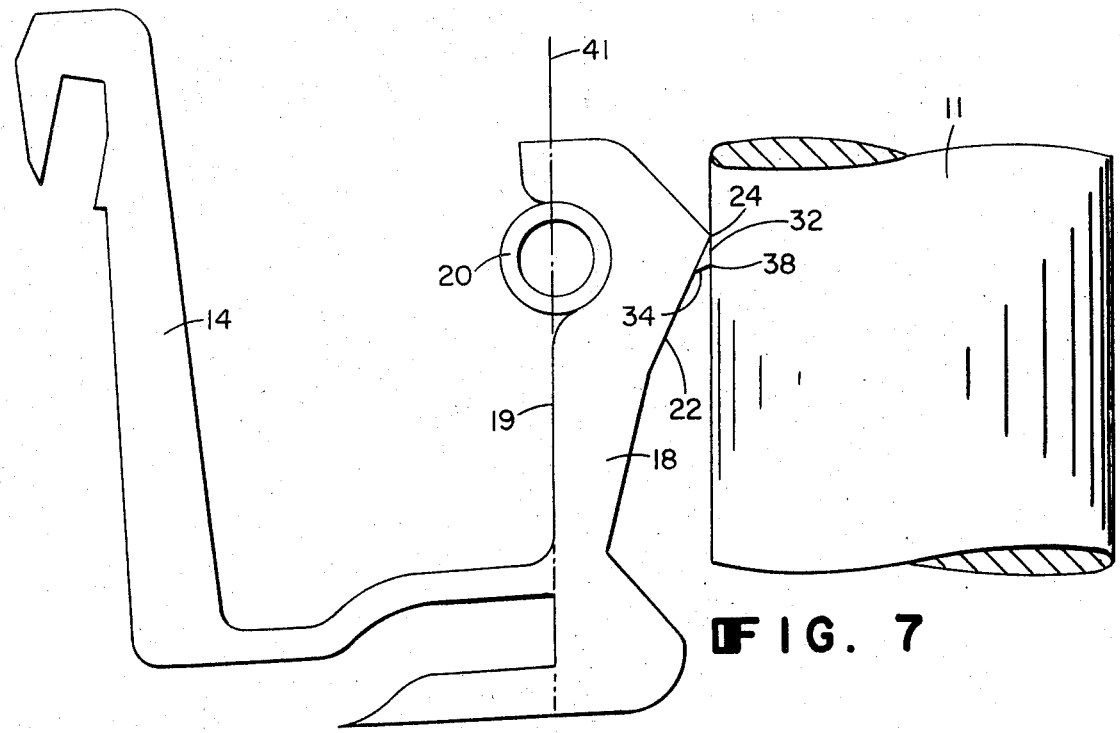
FIG. 7 is a view similar to that of FIG. 2 but with the seal in the on-shaft position.

When seal 10 is assembled to a shaft 11 (FIG. 7) flexible portion 18 is stretched to fit the shaft and inner side 19 becomes parallel to the shaft. At the same time long side 32 of rib 26 is also moved to a position parallel to the shaft and lies exactly against the side of shaft 11.

In operation, flexible portion 18 is stretched slightly and forced outwardly to fit shaft 11 (FIG. 7), making long side 32 of rib 26 lie parallel to the shaft. Sealing edge 24 is flattened slightly under pressure to form a sealing band, with hydrodynamic ribs 26 tangent to the band on the air side of the sealing band. Ribs 26 exert a pumping action on the liquid (for instance oil) and continually sweep it back towards the liquid side of the seal.

It will be understood by those skilled in the art that the seal of the invention may also be of the external type, wherein the seal is surrounded by the cylindrical surface, such as that of a housing, to be sealed.

In the fluid seal of the invention, the cross-section of the rib need not be triangular, but could be, for example, rectangular or rounded. Additionally, the plane of the ellipse may be so chosen as to provide an elliptical or other segment of greater or smaller curvature. The overall length of the segment and the number of segments may also be varied as desired, with two segments as a practical lower limit, and all these parameters together provide great flexibility in the design of a fluid seal, suitable for a particular application.

What is claimed is:

1. For use in combination with an element with a smoothly curved cylindrical surface, a bidirectional seal comprising a molded sealing element of resilient material having a frusto-conical sealing element surface having a longitudinal axis and terminating in a constant radius circular sealing edge and a plurality of discrete spaced rib segments formed on said frusto-conical sealing element surface, each said rib segment a. extending in a straight line in the plane perpendicular to said frusto-conical surface b. extending in a line smoothly convexly curved solely in a direction toward said sealing edge in the plane perpendicular to said longitudinal axis.

c. having an average radius of curvature in the plane perpendicular to said longitudinal axis greater than that of said sealing edge d. tangential to said sealing edge at a point centrally between its ends e. spaced at its ends a limited distance from said sealing edge f. having its ends circumferentially spaced from the end of an adjacent segment and g. having a surface inclined radially inwardly toward said longitudinal axis, the portion of said inclined surface in contact with a said smoothly curved surface being substantially parallel with the axis of said sealing ring.

* * * * *